US010990458B2

(12) United States Patent
Hirawady et al.

(10) Patent No.: US 10,990,458 B2
(45) Date of Patent: Apr. 27, 2021

(54) EVENT COMMUNICATION BETWEEN APPLICATIONS

(71) Applicant: ADP, LLC, Roseland, NJ (US)

(72) Inventors: Michael Hirawady, New York, NY (US); Kuntal Roy, New York, NY (US); Lohit Sarma, New York, NY (US); Meir Rosner, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/383,306

(22) Filed: Apr. 12, 2019

(65) Prior Publication Data

US 2020/0327000 A1    Oct. 15, 2020

(51) Int. Cl.
G06F 9/54      (2006.01)
G06Q 10/10     (2012.01)
G06F 8/00      (2018.01)

(52) U.S. Cl.
CPC ........... G06F 9/546 (2013.01); G06F 8/00 (2013.01); G06F 9/542 (2013.01); G06F 9/544 (2013.01); G06Q 10/105 (2013.01)

(58) Field of Classification Search
CPC ................................ G06F 9/542; G06F 9/546
USPC ................................................ 719/313, 318
See application file for complete search history.

(56) References Cited

U.S. PATENT DOCUMENTS

| 7,478,405 B2 | 1/2009 | Hinson et al. |
| 7,941,448 B2 | 5/2011 | Eslambolchi et al. |
| 8,027,922 B2 | 9/2011 | Lee |
| 8,046,772 B2 * | 10/2011 | Upton ............... G06F 9/541 717/100 |
| 10,019,242 B2 | 7/2018 | Rogers et al. |
| 10,218,803 B2 * | 2/2019 | Ameling ............. G06F 8/30 |
| 10,521,263 B2 * | 12/2019 | Xu .................. G06F 9/4806 |
| 2008/0307436 A1 | 12/2008 | Hamilton |

OTHER PUBLICATIONS

Cesar de la Torre, Implementing event-based communication between microservices (integration events) 2018, Microsoft Docs, pp. 1-7.*
De La Torre et al., "Implementing event-based communication between microservices (integration events)," Oct. 1, 2018, Microsoft, 7 pages, https://docs.microsoft.com/en-us/dotnet/standard/microservices-architecture/multi-container-microservice-net-applications/integration-event-based-microservice-communications.

* cited by examiner

*Primary Examiner* — Andy Ho
(74) *Attorney, Agent, or Firm* — Yee & Associates, P.C.

(57) ABSTRACT

A system and method for communicating events between applications. A first application receives event information for an event. A first action is performed by the first application in response to receiving the event information. The first application generates an event message comprising an event name and a message payload. The message payload comprises at least a portion of the event information. The first application publishes the event message by sending the event message to an event message pipeline. A second application may listen for the event message in the event message pipeline, receive the event message from the event message pipeline, and use the message payload to perform a second action, wherein the second action is different from the first action.

20 Claims, 6 Drawing Sheets

EVENT COMMUNICATION BETWEEN APPLICATIONS

BACKGROUND INFORMATION

1. Field

The present disclosure relates generally to computer applications running in an information processing system and to the communication of information between such applications. More particularly, illustrative embodiments are related to the communication of event information for business events between applications in a computer implemented human capital management system.

2. Background

An application is a computer program that is designed to run on a data processing system to perform a group of coordinated functions, tasks, or activities for the benefit of a user. An application also may be referred to as an app, an application program, or a software application.

An organization, such as a business entity or another appropriate organization, may use a variety of different applications to perform a variety of different actions. For example, a business organization may use a variety of different applications to perform a variety of different actions related to human capital management. Human capital management also may be referred to as human resource management.

An application may perform particular actions in response to receiving a particular input. For example, an application may perform particular actions in response to receiving an input of information regarding the occurrence of an event. Different applications may perform different actions in response to the occurrence of the same event.

For example, an application for determining employee benefits in a human capital management system may update benefit eligibility for an employee of a business in response to receiving information regarding the marriage of the employee. An application for managing payroll for the business in the human capital management system may update payroll tax deduction information for the employee in response to the same event regarding the marriage of the employee. An application for managing employee time-off in the human capital management system may update family and medical leave policies that apply to the employee in response to the event regarding the marriage of the employee.

Accordingly, it would be beneficial to have a method and apparatus that take into account one or more of the issues discussed above, as well as other possible issues. For example, it would be beneficial to have a method and apparatus for effectively providing information to a variety of different applications that may use the information to perform a variety of different actions. More particularly, it would be beneficial to have a method and apparatus for effectively providing information regarding the occurrence of an event to a variety of different applications that perform a variety of different actions in response to the event. As a more specific example, it would be beneficial to have a method and apparatus for effectively providing information regarding the occurrence of a business event to a variety of different applications that perform a variety of different actions for human capital management in response to the event.

SUMMARY

The illustrative embodiments provide a method of communicating events between applications. An application receives event information for an event. The application performs an action in response to receiving the event information. The application generates an event message. The event message comprises an event name and a message payload. The message payload comprises the event information. The application publishes the event message by sending the event message to an event message pipeline.

The illustrative embodiments also provide a further method of communicating events between applications. An application listens for an event message in an event message pipeline. The event message comprises an event name and a message payload comprising event information for an event. The application receives the event message from the event message pipeline. The application uses the message payload to perform an action.

The illustrative embodiments also provide a system for communicating events between applications comprising an information processing system and an application configured to run on the information processing system. The application is configured to receive event information for an event and to perform an action in response to receiving the event information. The application comprises an event publisher configured to generate an event message and to publish the event message by sending the event message to an event message pipeline. The event message comprises an event name and a message payload. The message payload comprises the event information.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, objectives, and features thereof, will best be understood by reference to the following detailed description of an illustrative embodiment of the present disclosure when read in conjunction with the accompanying drawings, wherein:

DETAILED DESCRIPTION

Figure 1:
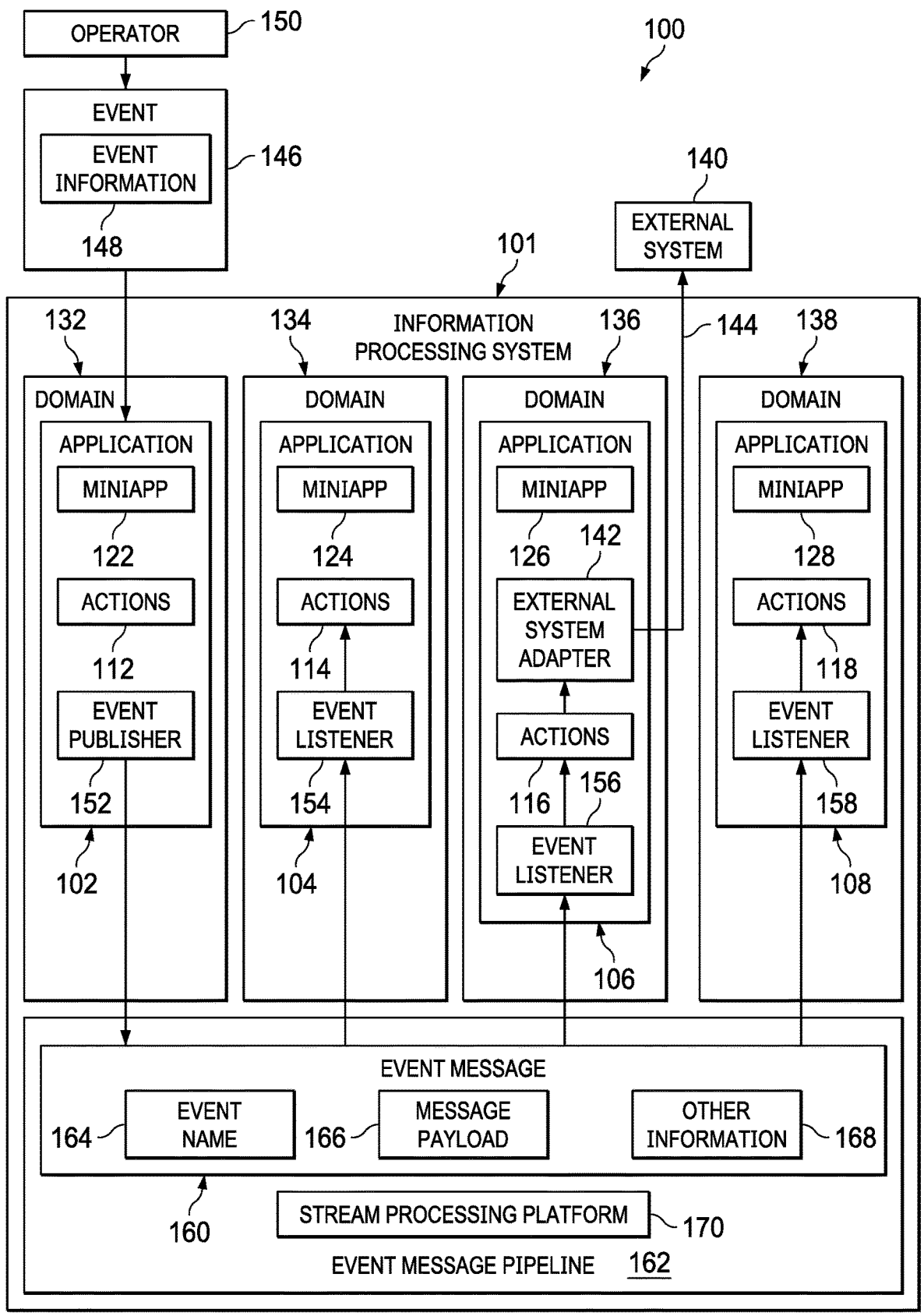
FIG. 1 is an illustration of a block diagram of an event communication environment in accordance with an illustrative embodiment.

The different illustrative embodiments recognize and take into account a number of different considerations. "A number," as used herein with reference to items, means one or more items. For example, "a number of different considerations" are one or more different considerations.

The illustrative embodiments recognize and take into account that a business organization or other entity may use various different applications running on an information processing system to perform various different actions. "Actions" performed by an application also may be referred to as functions, tasks, or activities. For example, without limitation, a business organization may use a plurality of different applications to perform various different actions in a computer implemented system for human capital management.

The illustrative embodiments recognize and take into account that a variety of different applications in use by an organization may perform a variety of different actions in response to the occurrence of the same event. Therefore, it is desirable that information regarding the occurrence of the event is provided effectively to the various different applications that perform actions in response to the occurrence of the event. For example, one application for performing actions in response to the occurrence of an event may receive event information regarding the occurrence of the event. In this case, it is desirable that the event information received by the one application is communicated effectively to other applications that perform other actions in response to the event.

The illustrative embodiments provide a method and system for communicating information between computer applications using a publication and subscription model. In accordance with an illustrative embodiment, an application that receives information as input to perform an action also may publish that information for use by other applications. Other applications may listen for the publication of the information by the first application and receive the published information to perform different actions using the information. For example, without limitation, the information received and published by the first application, and used by the first application and the other applications to perform various different actions, may be event information regarding the occurrence of an event.

For example, without limitation, illustrative embodiments provide a system and method for the communication of event information regarding the occurrence of business events between applications for performing various different actions in a computer implemented human capital management system. For example, without limitation, illustrative embodiments may provide for the communication of event information regarding the occurrence of business events between a plurality of miniapps for performing various different actions in a computer implemented human capital management system. In accordance with an illustrative embodiment, multiple actions may be grouped together in a miniapp as one business event.

The illustrative embodiments recognize and take into account that the communication of event information between applications for performing different actions using the event information may be achieved by relatively tight coupling between the applications running in an information processing system. However, the illustrative embodiments also recognize and take into account that it may be desirable to have a relatively looser coupling between applications to improve the scalability and resiliency of the system architecture. Looser coupling between applications may support an increase in the complexity and quantity of applications that may be provided to perform a variety of actions in an information processing system.

The publication and subscription model for the communication of event information between applications in accordance with an illustrative embodiment provides for the communication of event information between applications using a loose coupling between applications. In accordance with an illustrative embodiment, the communication of event information between applications is provided without any direct dependencies between applications. Therefore, illustrative embodiments provide for the communication of event information between various applications that may be deployed independently.

Illustrative embodiments provide a distributed system for the communication of event information between applications. In accordance with an illustrative embodiment, an application that receives event information may publish the event information to communicate the event information to multiple subscribing applications at the same time. Therefore, multiple actions may be performed by multiple subscribing applications simultaneously.

Systems and methods for the communication of events between applications in accordance with an illustrative embodiment also provide for more easy integration with other applications. In accordance with an illustrative embodiment, both inbound and outbound business events may be exposed to externally developed applications, miniapps, or other products.

Turning to FIG. 1, an illustration of a block diagram of an event communication environment is depicted in accordance with an illustrative embodiment. Event communication environment 100 may be any appropriate environment in which a plurality of applications 102, 104, 106, and 108 are run to perform a plurality of corresponding actions 112, 114, 116, and 118. An event communication environment in accordance with an illustrative embodiment may include more or fewer applications to perform more or fewer actions than are illustrated as an example in FIG. 1. An event communication environment in accordance with an illustrative embodiment may include any appropriate number of applications to perform any appropriate number of actions.

One or more of applications 102, 104, 106, and 108 may be implemented as miniapps 122, 124, 126, and 128, respectively. For example, without limitation, one or more of applications 102, 104, 106, and 108 used to perform corresponding actions 112, 114, 116, and 118 by or for a business or other entity may be implemented as miniapps 122, 124, 126, and 128, respectively.

Miniapps 122, 124, 126, and 128 are relatively small or simple, discrete, user facing applications. For example, miniapp 122, 124, 126, or 128 may be configured to provide only one function or a few functions for a user. Miniapps 122, 124, 126, and 128 may be built using building blocks, as described, for example, in U.S. Pat. No. 10,019,242, entitled User Interface Engine for Miniapp Development, which is incorporated by reference herein in its entirety. In this example, building blocks are distinct, atomic units of functionality executable by a computer to perform a function. Multiple building blocks may be combined together to form miniapp 122, 124, 126, or 128. In some cases, miniapp 122, 124, 126, or 128 may be formed by a single building block.

Event communication environment 100 may be implemented in information processing system 101. Information processing system 101 may comprise any appropriate system for running applications 102, 104, 106, and 108. For example, information processing system 101 may comprise one or more computers. Information processing system 101 may comprise a plurality of computers that may be connected in communication with each other by any appropriate local or distributed network. For example, without limitation, information processing system 101 may be implemented using data processing system 800 in FIG. 8.

Information processing system 101 may be operated by or for any appropriate entity to perform any appropriate actions 112, 114, 116, and 118 for the entity. For example, without limitation, information processing system 101 may be operated by or for a business entity, a government entity, a military organization, a charitable organization, an educational organization, a scientific or research entity, or any other appropriate entity or combination of entities.

Applications 102, 104, 106, and 108 running in information processing system 101 may perform any corresponding actions 112, 114, 116, and 118 that are appropriate for the entity for which information processing system 101 is operated. For example, without limitation, when information processing system 101 is operated by or for a business entity, applications 102, 104, 106, and 108 may perform corresponding actions 112, 114, 116, and 118 that are related to managing the human resources of the business entity. In this case, applications 102, 104, 106, and 108 running on information processing system 101 may implement a human capital management system for the business entity.

In accordance with an illustrative embodiment, applications 102, 104, 106, and 108 perform corresponding actions 112, 114, 116, and 118 in different corresponding domains 132, 134, 136, and 138. Each of domains 132, 134, 136, and 138 may include corresponding application 102, 104, 106, or 108 for performing corresponding actions 112, 114, 116, or 118. Each of domains 132, 134, 136, and 138 may include one or more other applications, not shown in FIG. 1, for performing other actions in domain 132, 134, 136, or 138. The actions performed by the one or more applications within each of domains 132, 134, 136, and 138 may be relatively closely related to each other. For example, without limitation, the actions performed by the applications within each of domains 132, 134, 136, and 138 may be directed to similar or related tasks. However, the actions performed by the applications within each one of domains 132, 134, 136, and 138 are different from the actions performed by the applications within other ones of domains 132, 134, 136, and 138.

Therefore, in this example, actions 112 performed by application 102 in domain 132 are different from actions 114, 116, and 118 performed by corresponding applications 104, 106, and 108 in corresponding domains 134, 136, and 138. Actions 114 performed by application 104 in domain 134 are different from actions 112, 116, and 118 performed by corresponding applications 102, 106, and 108 in corresponding domains 132, 136, and 138. Actions 116 performed by application 106 in domain 136 are different from actions 112, 114, and 118 performed by corresponding applications 102, 104, and 108 in corresponding domains 132, 134, and 138. Actions 118 performed by application 108 in domain 138 are different from actions 112, 114, and 116 performed by corresponding applications 102, 104, and 106 in corresponding domains 132, 134, and 136.

One or more actions 112, 114, 116, and 118 performed by one or more corresponding applications 102, 104, 106, and 108 may affect one or more systems that are external to information processing system 101 on which applications 102, 104, 106, and 108 are running. A system is external to information processing system 101 if it does not use the resources of information processing system 101 to perform actions. In other words, a system that is external to information processing system 101 would not be considered to be a part of information processing system 101 by a person of ordinary skill in the art.

For example, one or more actions 116 performed by application 106 may affect external system 140. Actions 116 performed by application 106 may control the operation of external system 140 to perform an action or may affect the operation of external system 140 in any other appropriate manner. For example, without limitation, one or more actions 116 performed by application 106 may generate a message or signal that may be provided to external system 140 to affect the operation of external system 140.

Application 106 may include external system adapter 142. External system adapter 142 may convert a message or signal generated by performing one or more actions 116 by application 106 into an appropriate form for delivery to and use by external system 140. Alternatively, some or all of the functions performed by external system adapter 142 may be performed by external system 140 or by another system or function that is not part of application 106 or external system 140 and that may be implemented within or external to information processing system 101.

A message or signal generated by performing one or more actions 116 by application 106 may be delivered to external system 140 via connection 144. Connection 144 may be a wired connection, a wireless connection, a fiber optic connection, or any other appropriate connection or combination of connections for delivering a signal or message from application 106 running in information processing system 101 to external system 140. For example, without limitation, connection 144 may comprise an appropriate network connection between information processing system 101 and a computer or other data processing system on which external system 140 is implemented.

Different actions 112, 114, 116, and 118 are performed by corresponding applications 102, 104, 106, and 108 in response to the occurrence of event 146. The occurrence of event 146 may be indicated by event information 148. Event information 148 may merely identify event 146 or otherwise indicate that event 146 has occurred. Alternatively, event information 148 may include additional information regarding event 146. Some or all of event information 148 may be used by applications 102, 104, 106, and 108 as input to perform corresponding actions 112, 114, 116, and 118.

Event information 148 indicating the occurrence of event 146 may be received by a first one of applications 102, 104, 106, and 108. For example, event information 148 may be received by application 102. Event information 148 may be received by application 102 in any appropriate manner. For example, operator 150 may provide event information 148 to information processing system 101 for use by application 102. Operator 150 may be a human operator, an automated device or system for providing event information 148, or a human operator in combination with an automated system. When operator 150 is a human operator, event information 148 may be provided to application 102 via an appropriate user interface provided by application 102.

Upon receiving event information 148, application 102 may use event information 148 to perform actions 112. In accordance with an illustrative embodiment, application 102 may communicate event information 148 to other applications 104, 106, and 108 by publishing event information 148. For example, application 102 may include event publisher 152. Event publisher 152 may be configured to publish event information 148 in the form of event message 160. Event publisher 152 may be configured to generate event message 160 based on event information 148 and to publish event message 160 by sending event message 160 to event message pipeline 162. In this example, application 102 may be referred to as a publishing application.

Other applications 104, 106, and 108 may be configured to listen for the publication of event message 160 on event message pipeline 162. For example, applications 104, 106, and 108 may include corresponding event listeners 154, 156, and 158. Event listeners 154, 156, and 158 may be configured to listen for the publication of a relevant event message on event message pipeline 162 and to receive a relevant message from event message pipeline 162 in response to identifying the publication of the relevant event message on event message pipeline 162. In this example, event message 160 is relevant to applications 104, 106, and 108 because corresponding actions 114, 116, and 118 are performed by applications 104, 106, and 108 in response to the occurrence of event 146 identified in event message 160. Therefore, in this example, event listeners 154, 156, and 158 will identify the publication of event message 160 on event message pipeline 162 and will receive event message 160 from event message pipeline 162. Applications 104, 106, and 108 then may perform corresponding actions 114, 116, and 118 using event information 148 from received event message 160. In this example, applications 104, 106, and 108 may be referred to as subscribing applications.

Event message 160 may include event name 164 and message payload 166. Event name 164 may be used by subscribing applications 104, 106, and 108 to identify the publication of relevant event message 160 on event pipeline 162. Message payload 166 may include some or all of event information 148 for event 146. Event message 160 also may include other information 168 as may be appropriate.

Event message pipeline 162 may be implemented in any appropriate manner. For example, event message pipeline 162 may be implemented as stream processing platform 170. For example, without limitation, event message pipeline 162 may be implemented using Apache Kafka open-source stream processing software platform or any other appropriate stream processing platform 170. Event message pipeline 162 may be implemented as part of information processing system 101. Alternatively, event message pipeline 162 may be implemented separate from information processing system 101, in whole or in part.

Figure 2:
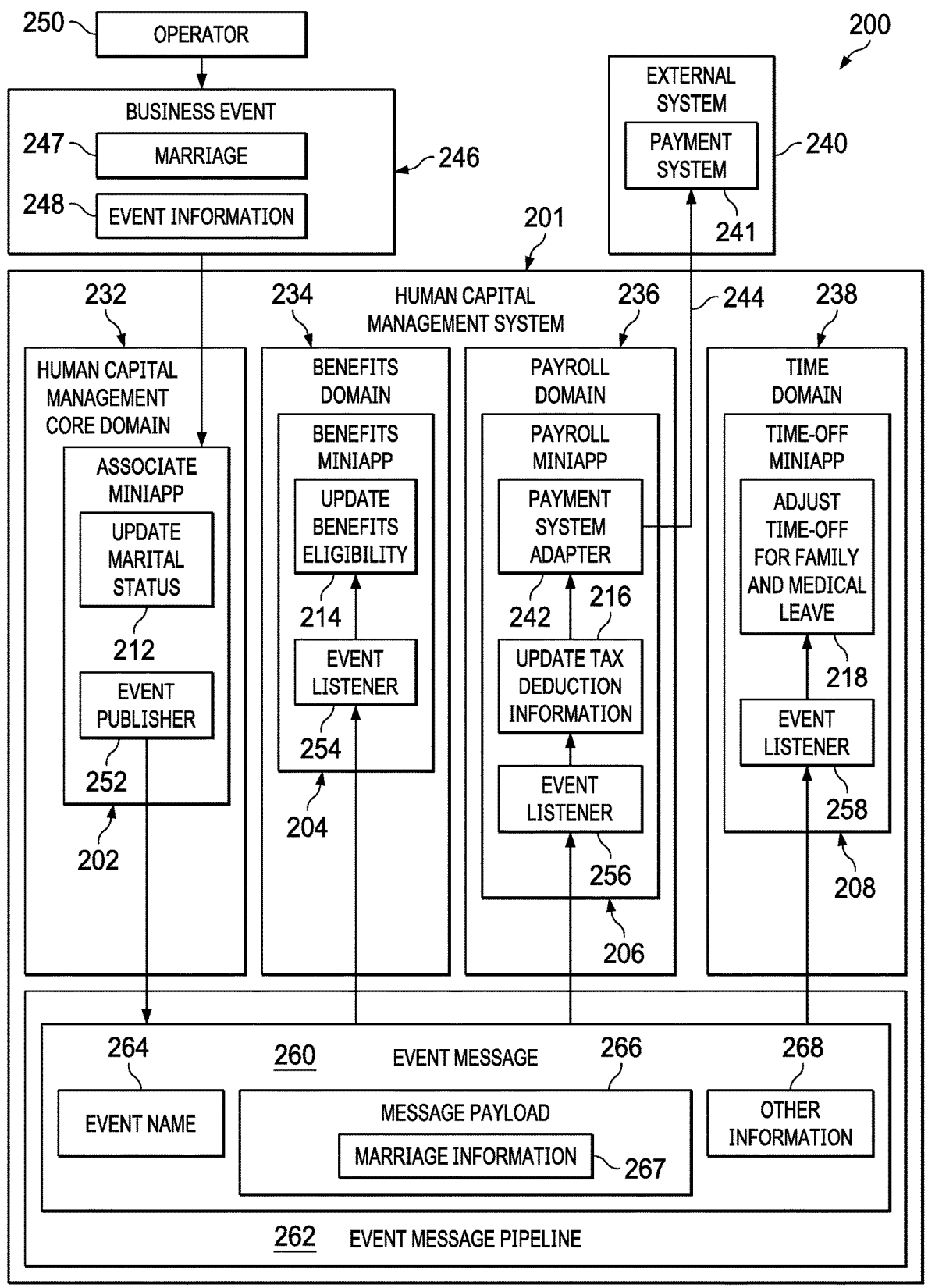
FIG. 2 is an illustration of a block diagram of an example of a business event communication environment in accordance with an illustrative embodiment.

Turning to FIG. 2, an illustration of a block diagram of a business event communication environment is depicted in accordance with an illustrative embodiment. Business event communication environment 200 is an example of one implementation of event communication environment 100 in FIG. 1.

Business event communication environment 200 may comprise human capital management system 201. Human capital management system 201 may be a computer implemented human capital management system. Human capital management system 201 may be implemented using any appropriate information processing system. For example, without limitation, human capital management system 201 may be implemented using data processing system 800 in FIG. 8.

Human capital management system 201 may include associate miniapp 202 in human capital management core domain 232, benefits miniapp 204 in benefits domain 234, payroll miniapp 206 in payroll domain 236, and time-off miniapp 208 in time domain 238. A business event communication environment or human capital management system in accordance with an illustrative embodiment may include more or fewer applications to perform more or fewer actions than are illustrated as an example in FIG. 2. A business event communication environment or human capital management system in accordance with an illustrative embodiment may include any appropriate number of applications to perform any appropriate number of actions.

Associate miniapp 202, benefits miniapp 204, payroll miniapp 206, and time-off miniapp 208 may perform different actions in response to the occurrence of business event 246. For example, without limitation, business event 246 may be the marriage 247 of an employee of a business or other entity for which human capital management system 201 is operated. The employee or another appropriate operator 250 may provide event information 248 for the marriage 247 to associate miniapp 202 in human capital management system 201. In response to receiving event information 248, associate miniapp 202 may update marital status 212 in an employee profile for the employee in human capital management system 201. The marriage 247 of the employee is a business event 246 that also is relevant to benefits miniapp 204, payroll miniapp 206, and time-off miniapp 208, which perform other actions in human capital management system 201 in response to the occurrence of business event 246.

In accordance with an illustrative embodiment, associate miniapp 202 may communicate event information 248 regarding marriage 247 to benefits miniapp 204, payroll miniapp 206, and time-off miniapp 208, by publishing event information 248. For example, associate miniapp 202 may include event publisher 252. Event publisher 252 may be configured to publish event information 248 in the form of event message 260. Event publisher 252 may be configured to generate event message 260 based on event information 248 and to publish event message 260 by sending event message 260 to event message pipeline 262. In this example, associate miniapp 102 may be referred to as a publishing application.

Event message 260 may include event name 264 and message payload 266. Message payload 266 may include some or all of event information 248 for business event 246. In this example, message payload 266 may include marriage information 267 regarding marriage 247 of the employee. Event message 260 also may include other information 268 as may be appropriate.

Benefits miniapp 204, payroll miniapp 206, and time-off miniapp 208 may be configured to listen for the publication of event message 260 on event message pipeline 262. For example, benefits miniapp 204 may include event listener 254, payroll miniapp 206 may include event listener 256, and time-off miniapp 208 may include event listener 258. Event listeners 254, 256, and 258 may be configured to listen for the publication of a relevant event message on event message pipeline 262 and to receive a relevant event message from event message pipeline 262 in response to identifying the publication of the relevant event message on event message pipeline 262. In this example, event message 260 is relevant to applications 204, 206, and 208 because applications 204, 206, and 208 perform various actions in response to the occurrence of business event 246 identified in event message 260. Therefore, in this example, event listeners 254, 256, and 258 will identify the publication of event message 260 on event message pipeline 262 and will receive event message 260 from event message pipeline 262. In this example, applications 204, 206, and 208 may be referred to as subscribing applications.

Applications 204, 206, and 208 may perform various different actions in response to the occurrence of business event 246 using event information 248 from event message 260 that is received from event message pipeline 262. For example, without limitation, benefits miniapp 204 may update benefits eligibility 214 for the employee in response to the change in marital status of the employee identified in event message 260. Payroll miniapp 206 may update payroll tax deduction information 216 for an automatic payment system 241 in response to the change in marital status of the employee identified in event message 260. Payment system 241 may be an external system 240 that is not a part of human capital management system 201. Payroll miniapp 206 may include payment system adapter 242 for configuring the updated payroll tax deduction information as appropriate and sending the updated payroll tax deduction information to payment system 241 via appropriate connection 244. Time-off miniapp 208 may be configured to adjust time-off for family and medical leave 218 for the employee in response to the change in marital status of the employee identified in event message 260.

Illustrative embodiments are not limited to the particular example described herein. As another example, without limitation, business event 246 may be an employee moving to another state. In this case, event information 248 identifying the new state of residence may be provided by the employee or another appropriate operator 250 to associate miniapp 202. Event message 260 for this business event 246 may be published on event message pipeline 262 by event publisher 252. Payroll miniapp 206 may listen for and receive this event message 260 from event message pipeline 262 and use event information 246 from event message 260 to update the tax information for the employee to reflect the tax code for the new state.

As a further example, an employee getting promoted may require multiple actions by various different miniapps in human capital management system. A cascading goals miniapp (not shown in FIG. 2) may check for the managerial hierarchy of the new employee position and send a notification to the employee of any new tasks to add and any new goals, if required. A compliance policy miniapp (not shown in FIG. 2) may check for any new policies that the employee must comply with due to the promotion. A compensation miniapp (not shown in FIG. 2), may check for any updates to the compensation for the employee, such as eligibility for new types of bonuses or stock options. In this example, the promotion of the employee is another example of business event 246 that may be communicated to various miniapps in human capital management system 201 by publication of an appropriate event message 260 on event message pipeline 262, as described herein.

Figure 3:
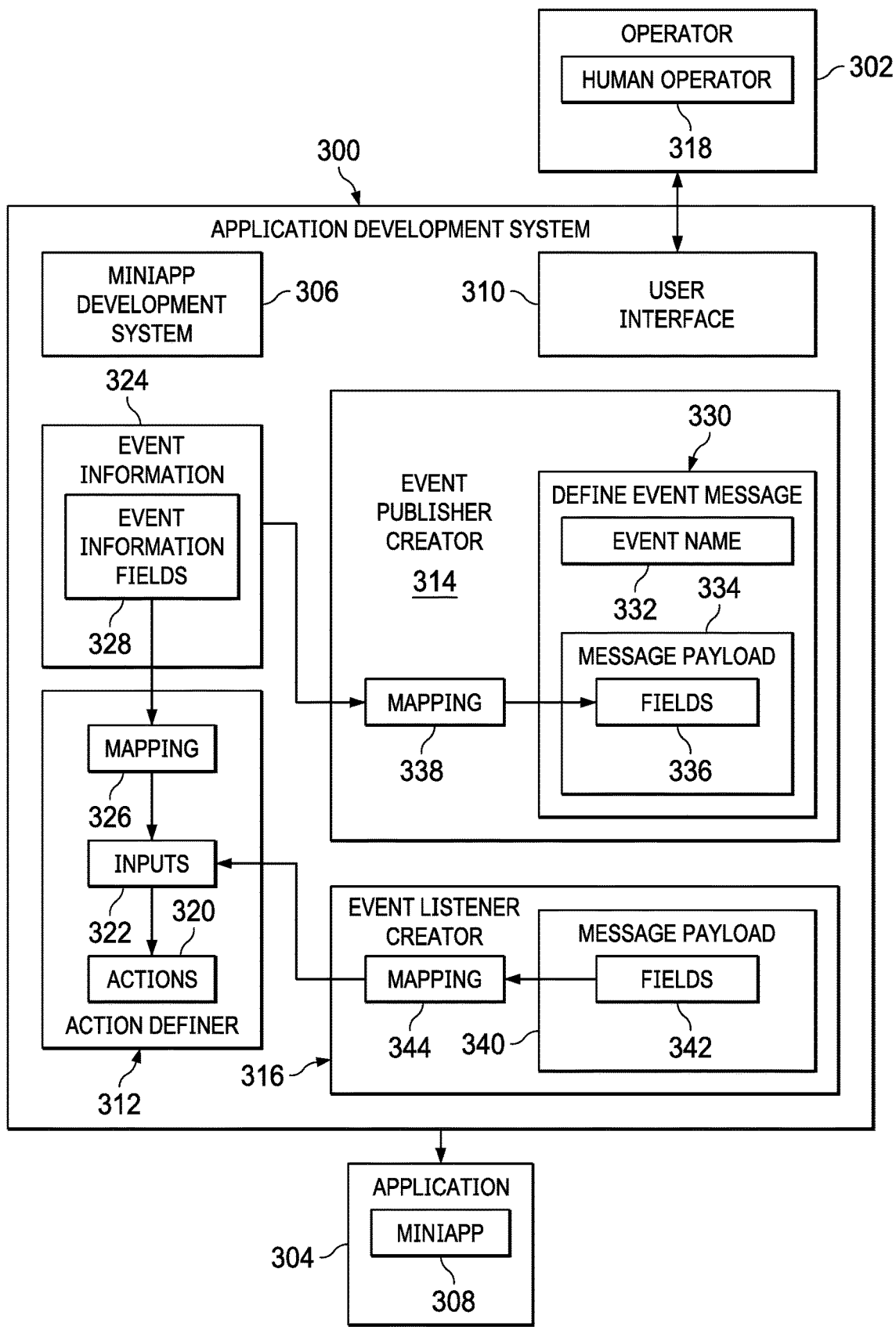
FIG. 3 is an illustration of a block diagram of an application development system in accordance with an illustrative embodiment.

Turning to FIG. 3, an illustration of a block diagram of an application development system is depicted in accordance with an illustrative embodiment. Application development system 300 may be used by operator 302 to develop application 304 that is configured for communicating events between applications by publishing and subscribing to event messages in accordance with an illustrative embodiment.

For example, without limitation, application development system 300 may be miniapp development system 306. Miniapp development system 306 may be used by operator 302 to create miniapp 308. For example, without limitation, miniapp development system 306 may be used to create associate miniapp 202, benefits miniapp 204, payroll miniapp 206, and time-off miniapp 208 for human capital management system in FIG. 2. For example, without limitation, miniapp development system 306 may be implemented as part of the application development system as described in U.S. Pat. No. 10,019,242, entitled User Interface Engine for Miniapp Development, with appropriate modifications to include the additional functionality described herein.

Application development system 300 may include user interface 310, action definer 312, event publisher creator 314, and event listener creator 316. User interface 310 may comprise any appropriate interface for operator 302 to use application development system 306. For example, when operator 302 is human operator 316, user interface 310 may include an appropriate graphical user interface.

Action definer 312 may be configured to be used by operator 302 to define actions 320 that are performed by application 304 in response to the occurrence of an event. Action definer 312 may be used to define event information 324 for an event that is used as inputs 322 for performing actions 320. For example, action definer 312 may be used for mapping 326 specific event information fields 328 in which specific event information 324 will be received to specific corresponding inputs 322 for performing actions 320.

Event publisher creator 314 may be configured to be used by operator 302 to define event message 330 that will be published by an event publisher in application 304 in response to receiving event information 324. Event publisher creator 314 may be used to define event name 332 and message payload 334 for the event message. For example, event publisher creator 314 may be used for mapping 338 event information fields 328 in which specific event information 324 will be received by application 304 into appropriate corresponding fields 336 in message payload 334 into which event information 324 will be copied when an event message is created by application 304.

Event listener creator 316 may be configured to be used by operator 302 to define how event information 324 that is received in message payload 340 of an event message by application 304 is used to perform actions 320 by application 304. For example, event listener creator 316 may be used for mapping 344 fields 342 in message payload 340 into which specific event information 324 is placed to corresponding appropriate inputs 322 for performing actions 320 by application 304.

Event listener creator 316 may be configured to be used by operator 302 to define how message information 324 that is received in message payload 340 of an event message by application 304 is used to perform actions 320 by application 304. For example, event listener creator 316 may be used for mapping 344 fields 342 in message payload 340 into which specific event information 324 is placed to corresponding appropriate inputs 322 for performing actions 320 by application 304.

The illustrations of FIGS. 1-3 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 4:
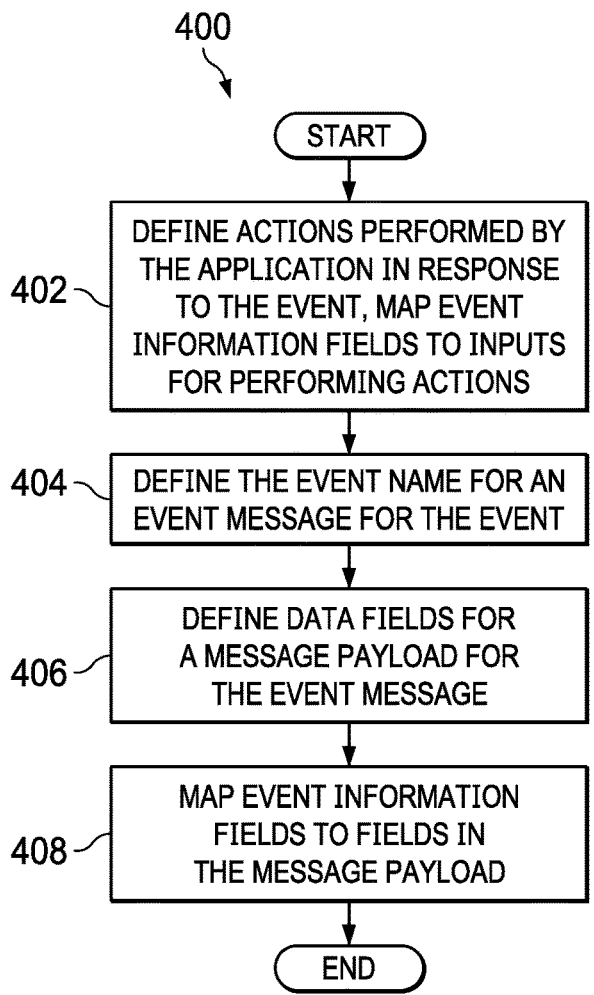
FIG. 4 is an illustration of a flowchart of a process for creating an event publisher in an application in accordance with an illustrative embodiment.

Turning to FIG. 4, an illustration of a flowchart of a process for creating an event publisher in an application is depicted in accordance with an illustrative embodiment. For example, without limitation, process 400 may be implemented using application development system 300 in FIG. 3.

Process 400 may begin with defining actions to be performed by the application in response to the occurrence of an event (operation 402). Operation 402 may include mapping event information to inputs for the actions to be performed. An event name for an event message for the event then may be defined (operation 404). Data fields for a message payload for the event message may be defined (operation 406). Event information fields may then be mapped to the data fields in the message payload (operation 408), with process 400 terminating thereafter.

Figure 5:
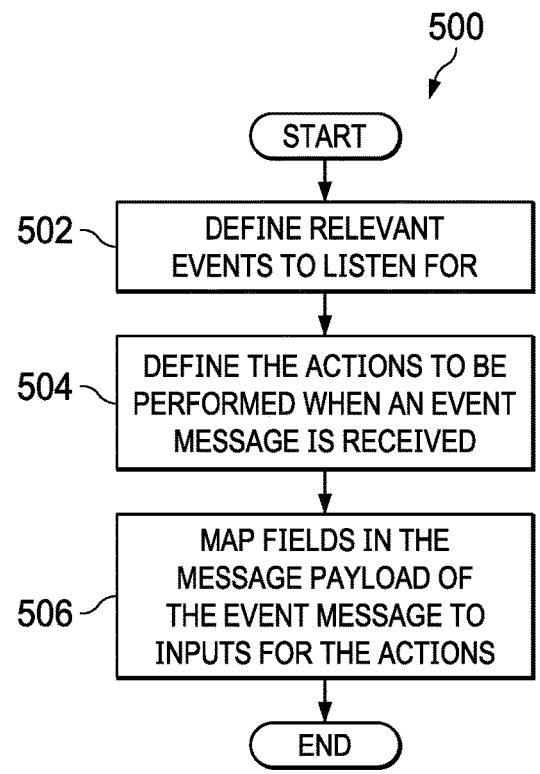
FIG. 5 is an illustration of a flowchart of a process for creating an event listener in an application accordance with an illustrative embodiment.

Turning to FIG. 5, an illustration of a flowchart of a process for creating an event listener in an application is depicted in accordance with an illustrative embodiment. For example, without limitation, process 500 may be implemented using application development system 300 in FIG. 3.

Process 500 may begin with defining relevant events to listen for (operation 502). For example, operation 502 may include selecting the event names of relevant events to listen for. The event names may be used to identify event messages for relevant events in an event message pipeline. Actions to be performed by the application in response to receiving a relevant event message may be defined (operation 504). Data fields in the message payload of a relevant event message may be mapped to inputs for the action to be performed (operation 506), with process 500 terminating thereafter.

Figure 6:
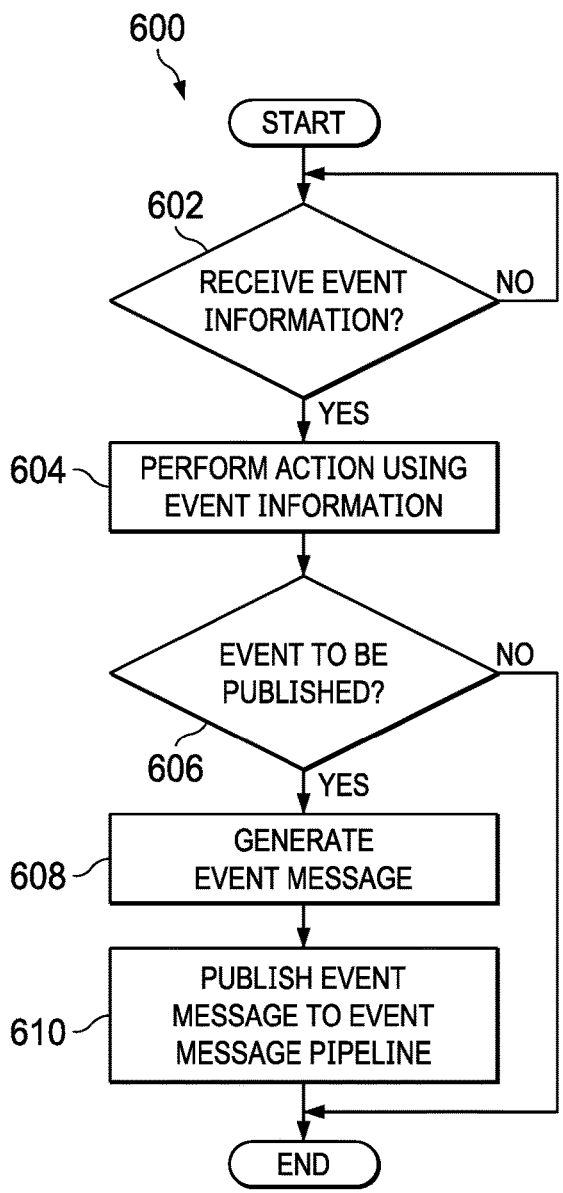
FIG. 6 is an illustration of a flowchart of a process for publishing an event message by an application in accordance with an illustrative embodiment.

Turning to FIG. 6, an illustration of a flowchart of a process for publishing an event message by an application is depicted in accordance with an illustrative embodiment. Process 600 may be implemented, for example, in an application in event communication environment 100 in FIG. 1.

Process 600 may begin with determining whether event information regarding the occurrence of an event has been received by an application (operation 602). In response to a determination at operation 602 that event information has not been receive, operation 602 is repeated until event information is received by the application. In response to a determination at operation 602 that event information has been received, an action is performed by the application using the event information (operation 604).

It then may be determined whether the event is to be published by the application (operation 606). The event may be published by the application if it is necessary or useful for one or more other applications to use the event information to perform one or more other actions that are different from the action performed by the application that received the event information. In response to a determination at operation 606 that the event is not to be published, process 600 terminates.

In response to a determination at operation 606 that the event is to be published, the application generates an event message (operation 608). The event message may include at least an event name, by which the event message may be identified, and a message payload. The message payload may include at least a portion of the event information received by the application. The event message may be published by sending the event message to an event message pipeline (operation 610), with process 600 terminating thereafter.

Figure 7:
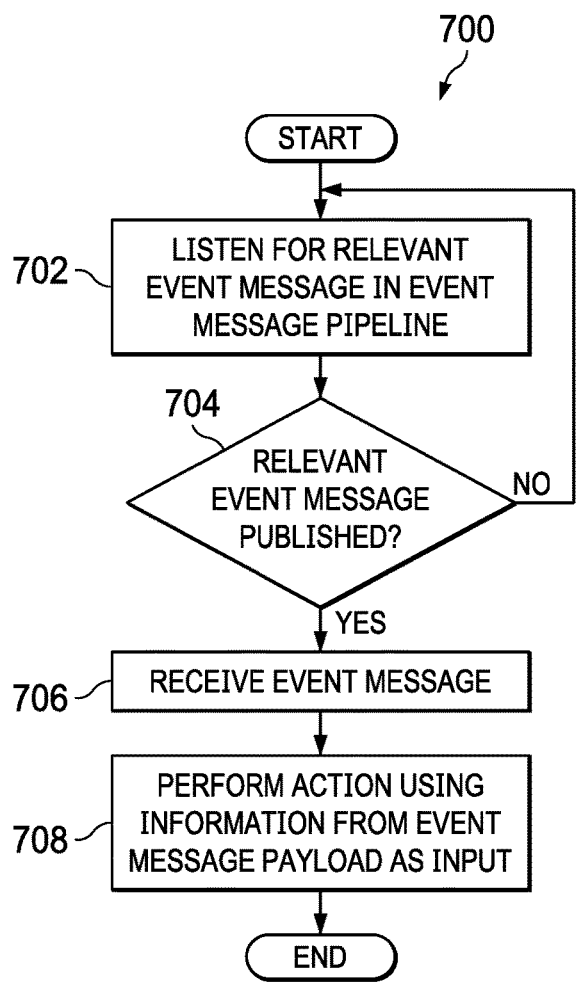
FIG. 7 is an illustration of a flowchart of a process for receiving an event message by an application in accordance with an illustrative embodiment.

Turning to FIG. 7, an illustration of a flowchart of a process for receiving an event message by an application is depicted in accordance with an illustrative embodiment. Process 700 may be implemented, for example, in an application in event communication environment 100 in FIG. 1.

Process 700 may begin with listening for a relevant event message in an event message pipeline (operation 702). It then may be determined whether a relevant event message has been published in the event message pipeline (operation 704). In response to a determination at operation 704 that a relevant event message has not been published, process 700 may return to operation 702 to continue to listen for a relevant event message in the event message pipeline until the publication of a relevant event message in the pipeline is detected.

In response to a determination at operation 704 that a relevant event message has been published, the event message may be received by the application (operation 706). The application then may perform an action using information from the event message payload as input (operation 708), with process 700 terminating thereafter.

Figure 8:
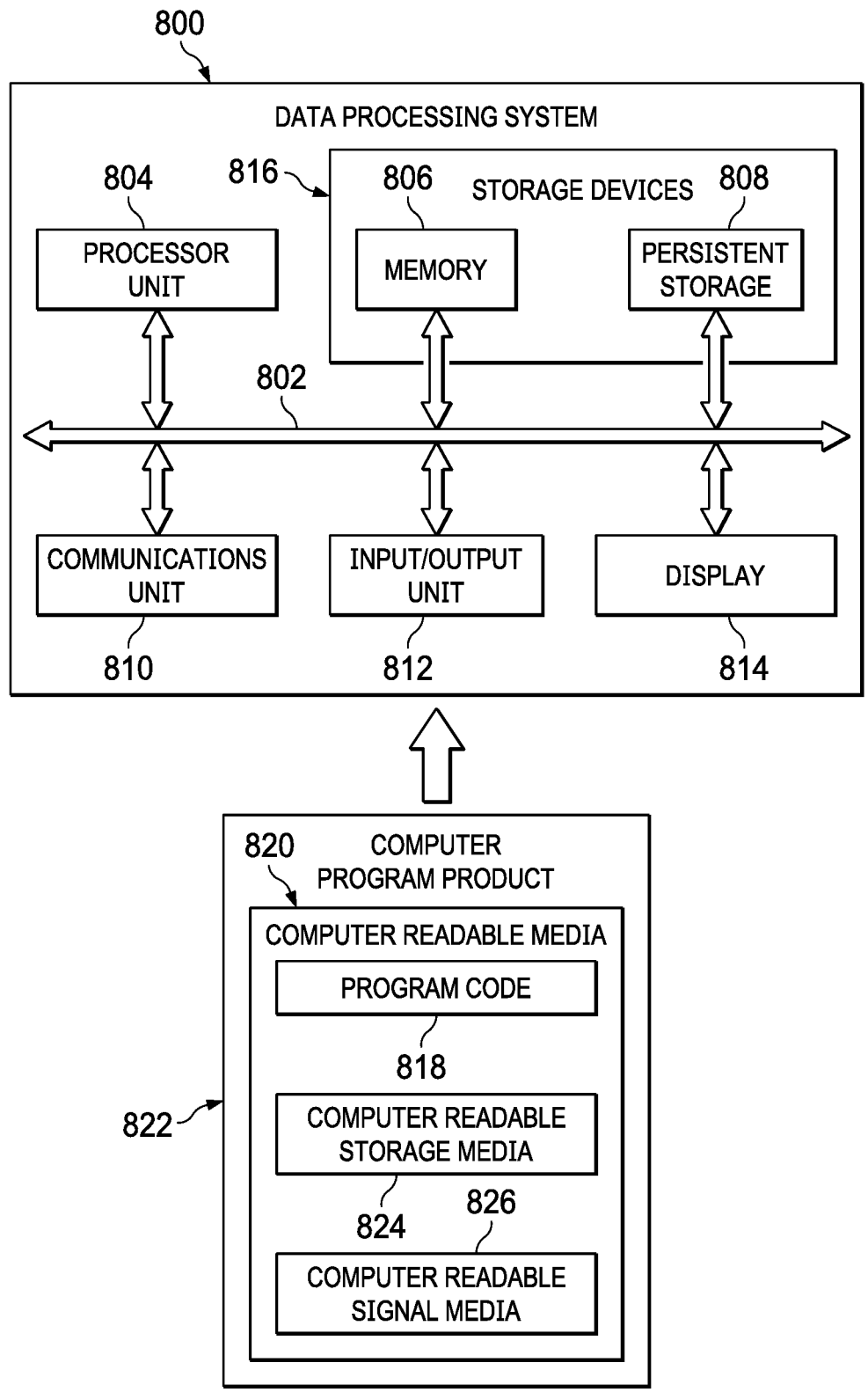
FIG. 8 is an illustration of a block diagram of a data processing system in accordance with an illustrative embodiment.

Turning to FIG. 8, an illustration of block diagram of a data processing system is depicted in accordance with an illustrative embodiment. Data processing system 800 in FIG. 8 is an example of a data processing system that may be used to implement the illustrative embodiments, such as in FIG. 1 through FIG. 3, or any other module or system or process disclosed herein. In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. This software may be an associative memory, content addressable memory, or software for implementing the processes described elsewhere herein. Thus, for example, software loaded into memory 806 may be software for executing one or more of process 400 of FIG. 4, process 500 of FIG. 5, process 600 of FIG. 6, and process 700 of FIG. 7. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 818 may be omitted because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

As another example, a storage device in data processing system 800 is any hardware apparatus that may store data. Memory 806, persistent storage 808, and computer readable media 820 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806, or a cache, such as found in an interface and memory controller hub that may be present in communications fabric 802.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of communicating events between applications, comprising:
    receiving, by a first application, event information for an event;
    performing a first action, by the first application, in response to receiving the event information;
    generating an event message, by the first application, wherein the event message comprises an event name and a message payload, wherein the message payload comprises fields mapped from event information fields in the event information; and
    publishing the event message, by the first application, by sending the message payload to an event message pipeline connected to domains such that each domain comprises, respectively, an event listener receiving the fields and mapping them into inputs within an action definer commanding actions by a miniapp in the domain.

2. The method of claim 1, wherein the event message pipeline is a stream processing platform and at least one of the domains comprising an external system adapter adapting the inputs for actions in a system both external and connected to the domain.

3. The method of claim 1, wherein the event is a business event and the domains and the first application being within an information processing system.

4. The method of claim 3, wherein the first application is a first miniapp in a human capital management system.

5. The method of claim 1 further comprising creating an event publisher for the first application using an application development system, wherein the event publisher is configured to generate the event message.

6. The method of claim 5, wherein the first application is a first miniapp, the application development system is a miniapp development system, and creating the event publisher comprises creating the event publisher for the first miniapp by a human operator using the miniapp development system wherein the human operator does not provide program code for the event publisher.

7. The method of claim 1 further comprising:
    listening for the event message in the event message pipeline by a second application;
    receiving the event message from the event message pipeline by the second application; and
    using the message payload, by the second application, to perform a second action, wherein the second action is different from the first action.

8. A method of communicating events between applications, comprising:
    listening, using an event listener in a first application in a domain of multiple domains in an information processing system connected to an event message pipeline, for an event message in the event message pipeline, such that the event message comprises an event name and a message payload comprising fields mapped from event information fields in event information for an event;
    receiving the event message from the event message pipeline by the first application; and using the message payload, the event listener receiving the fields and mapping them into inputs within an action definer commanding a first action by a miniapp in the domain.

9. The method of claim 8, wherein the event message pipeline is a stream processing platform and at least one of the domains comprising an external system adapter adapting the inputs for actions in a system both external and connected to the domain.

10. The method of claim 8, wherein the event is a business event.

11. The method of claim 10, further comprising a human capital management system comprising the first application.

12. The method of claim 8 further comprising creating the event listener for the first application using an application development system.

13. The method of claim 12, wherein the application development system is a miniapp development system, and creating the event listener comprises creating the event listener using the miniapp development system.

14. A system configured to communicate events between applications, such that the system comprises:
an information processing system;
a first application configured to:
run on the information processing system;
receive event information for an event; and
perform a first action in response to a reception of the event information; and
such that the first application comprises an event publisher configured to:
generate an event message that comprises a message payload that comprises fields mapped from event information fields in the event information; and
send the event message to an event message pipeline connected to domains that comprise, respectively, an event listener configured to map the fields in the message payload into inputs that command actions in an action definer.

15. The system of claim 14 further comprising the event message pipeline, wherein the event message pipeline is a stream processing platform and at least one of the domains comprises an external system adapter configured to adapt the inputs configured to command actions in a system connected to the at least one of the domains and external to the information processing system.

16. The system of claim 14 further comprising:
a second application configured to:
run on the information processing system in one of the domains; and
receive the event message from the event message pipeline; and
wherein the second application is configured to use the message payload to perform a second action, wherein the second action is different from the first action.

17. The system of claim 16, wherein the event is a business event.

18. The system of claim 17, wherein the information processing system comprises a human capital management system and wherein the first application and the second application are miniapps in the human capital management system.

19. The system of claim 16 further comprising an application development system configured to:
create the event publisher for the first application by mapping event information fields in the event information to fields in the message payload; and
create the event listener for the second application by mapping the fields in the message payload to inputs for performing the second action.

20. The system of claim 19, wherein the first application and the second application are miniapps, the application development system is a miniapp development system, and the miniapp development system is configured to allow a human operator to create the event publisher and the event listener wherein the human operator does not provide program code for the event publisher or the event listener.

* * * * *